United States Patent
Hedrick et al.

(10) Patent No.: US 9,995,206 B2
(45) Date of Patent: Jun. 12, 2018

(54) INTAKE AIR BOOST SYSTEM FOR TWO-CYCLE ENGINE HAVING TURBO-SUPERCHARGER

(71) Applicant: Southwest Research Institute, San Antonio, TX (US)

(72) Inventors: John C. Hedrick, Boerne, TX (US); Steven G. Fritz, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 67 days.

(21) Appl. No.: 15/094,062

(22) Filed: Apr. 8, 2016

(65) Prior Publication Data

US 2017/0292438 A1  Oct. 12, 2017

(51) Int. Cl.
| | |
|---|---|
| F02D 23/00 | (2006.01) |
| F02B 33/44 | (2006.01) |
| F02B 33/00 | (2006.01) |
| F02B 37/00 | (2006.01) |
| F02B 37/007 | (2006.01) |

(52) U.S. Cl.
CPC .......... *F02B 37/002* (2013.01); *F02B 37/007* (2013.01); *F05B 2220/40* (2013.01); *F05B 2250/02* (2013.01)

(58) Field of Classification Search
CPC .... F02B 37/002; F02B 37/007; F02B 37/073; F05B 2220/40
USPC .......... 60/600, 605.1, 612; 123/562
See application file for complete search history.

(56) References Cited

U.S. PATENT DOCUMENTS

| | | | | |
|---|---|---|---|---|
| 5,133,188 | A * | 7/1992 | Okada | F02B 37/04 123/562 |
| 6,263,673 | B1 * | 7/2001 | Schmidt | F02B 37/007 123/562 |
| 6,378,308 | B1 * | 4/2002 | Pfluger | F02B 37/007 123/562 |
| 7,490,594 | B2 * | 2/2009 | Van Dyne | F02B 37/10 123/559.3 |
| 2003/0074899 | A1 * | 4/2003 | Yamaguchi | F02B 37/007 60/612 |
| 2013/0101401 | A1 * | 4/2013 | Shimizu | F02B 37/007 415/175 |
| 2014/0116043 | A1 * | 5/2014 | Hirzel | F02B 37/04 60/612 |
| 2014/0260239 | A1 * | 9/2014 | Genter | F02B 37/007 60/599 |

(Continued)

FOREIGN PATENT DOCUMENTS

| | | | | |
|---|---|---|---|---|
| DE | 102009033519 | A1 * | 11/2010 | ............. F02B 37/013 |
| EP | 2042705 | A1 * | 4/2009 | ............. F02B 33/34 |

*Primary Examiner* — Tahi Ba Trieu
(74) *Attorney, Agent, or Firm* — Livingston Law Firm

(57) ABSTRACT

An air boost system for a two-cycle engine, such as an EMD engine, which operates with a gear-driven turbo-supercharger. The turbo-supercharger is undersized for the engine, such that it is insufficient to provide air flow for a target air-fuel ratio above a pre-determined mid-load threshold. An additional turbocharger is installed in parallel with the turbo-supercharger, such that the intake manifold may receive air intake from only the turbo-supercharger or from both the turbo-supercharger and the turbocharger. In operation, the turbocharger is active only at loads above the predetermined load threshold.

10 Claims, 10 Drawing Sheets

(56) References Cited

U.S. PATENT DOCUMENTS

| | | | |
|---|---|---|---|
| 2014/0373815 A1* | 12/2014 | Nagar | F02D 41/0007 123/51 B |
| 2015/0361905 A1* | 12/2015 | Lofgren | F02B 37/013 417/34 |
| 2016/0090902 A1* | 3/2016 | Svihla | F02B 37/007 60/599 |
| 2016/0177850 A1* | 6/2016 | Mogavero | F02D 41/0007 60/602 |

* cited by examiner

INTAKE AIR BOOST SYSTEM FOR TWO-CYCLE ENGINE HAVING TURBO-SUPERCHARGER

TECHNICAL FIELD OF THE INVENTION

This invention relates to two-cycle engines, and more particularly to an improved air boost system for a two-cycle engine equipped with a turbo-supercharger.

BACKGROUND OF THE INVENTION

The EMD engine, manufactured by Electro-Motive Diesel, is a two-stroke diesel engine. It is a medium-speed engine, used in locomotive, marine, and stationary power applications. The engine is made in V-8, V-12, V-16, and V-20 configurations. Most current locomotive production is the V-12 and V-16 version of the engine, whereas many of the marine and stationary engines are V-20 versions.

In addition to being a two-stroke diesel engine, the EMD engine is a uniflow scavenged engine. The engine requires an external air pump to provide enough differential air pressure across the cylinder to allow the engine to be scavenged correctly.

For an EMD engine, two different air pump systems have been used. A "naturally aspirated" engine has a gear-driven roots-type blower. A "turbo-supercharger" engine has a gear-driven turbocharger. The gear-driven turbocharger provides the required air flow at idle and light-to moderate loads. At higher loads, once the exhaust energy is high enough to sustain the turbocharger, an overriding clutch releases and the turbocharger "comes off the gear" maximizing engine efficiency.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Although this description is written in terms of an EMD engine, the same concepts could apply to other similar engines, that is, two-cycle engines having a driven "turbo-supercharger". For purposes of this description, a "turbo-supercharger" is the type discussed in the Background—gear-driven with an overriding clutch and conventional for EMD engines. The invention is useful for transportation applications (locomotive and marine), which operate with varying load conditions.

The following invention is directed to the recognition that the conventional turbo-supercharger system of an EMD engine results in arguably undesirable high AFRs (air-to-fuel ratios) at idle and light engine loads. As explained below, to solve this problem, rather than to provide a redesign of the existing air boost system, a smaller EMD "turbo-supercharger" can be installed to reduce the air being pumped to the engine at idle and light loads, and an auxiliary air boost system added to provide sufficient air at higher loads.

Figure 1:
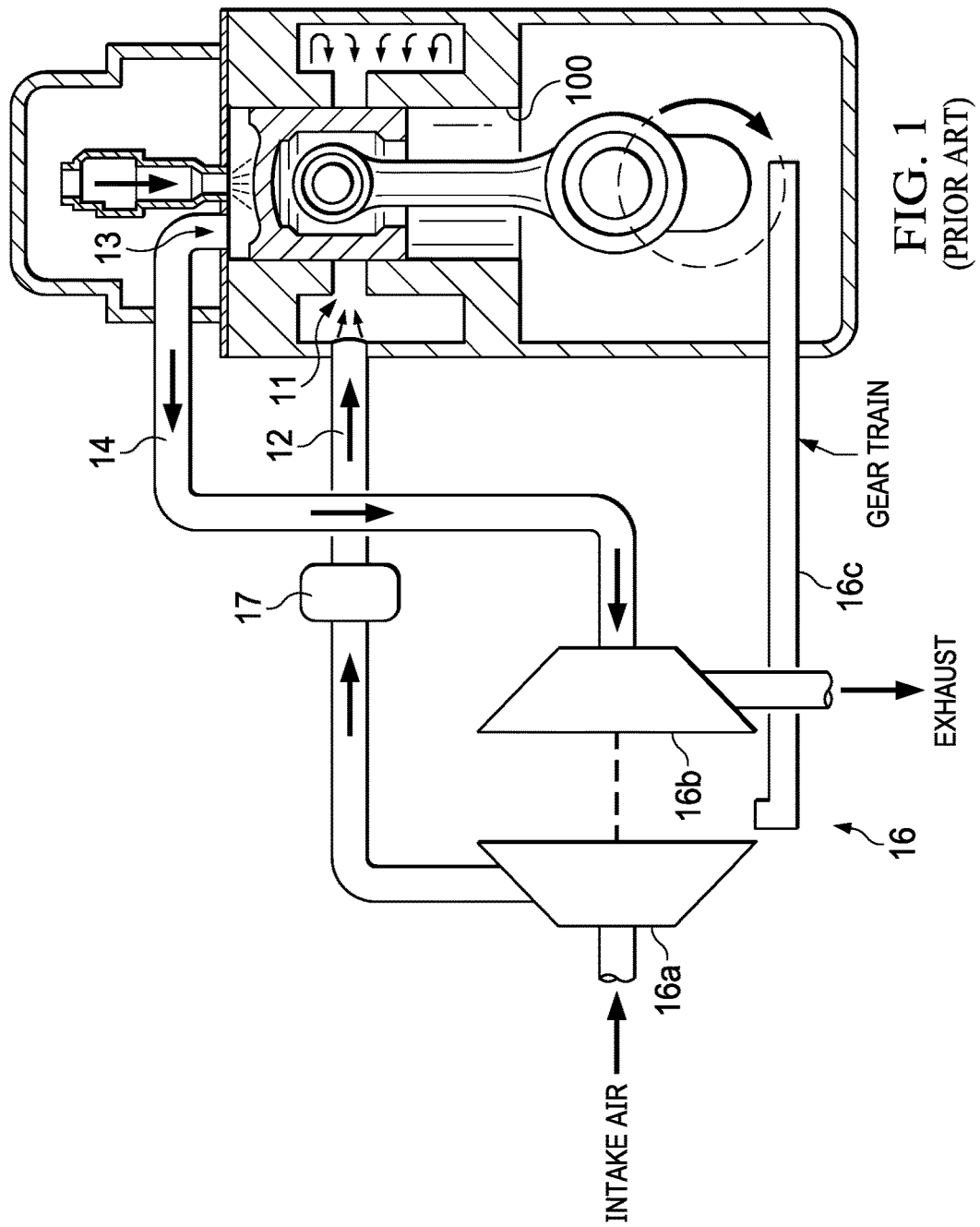
FIG. 1 is a representative drawing of a conventional EMD engine with a conventional air boost system.

FIG. 1 is a representative drawing of a conventional EMD engine. The engine is represented with a single cylinder 100, with the understanding that a production engine has many such cylinders, as well as various associated electrical and mechanical elements that are typically associated with an EMD engine system. In other words, only those parts of the engine relevant to the invention are shown.

For purposes of example herein, the engine is a 16 cylinder two-stroke diesel engine. This engine is commercially available as the EMD 710 engine, and as stated in the Background, the EMD 710 engine is also available with more or fewer cylinders.

For locomotive applications, the throttle system of the EMD engine is designed with a number of steps, referred to as "notches". Position 1 (Notch 1) is the lowest powered setting where current is delivered to the traction motors. Position 8 (Notch 8) is maximum engine speed and the position where maximum horsepower is available.

Cylinder 100 has an intake port 11, which receives intake air via an aftercooler 17 and then an intake manifold 12. Exhaust port 13 expels exhaust to an exhaust manifold 14. It should be understood that both the intake manifold 12 and exhaust manifold 14 serve additional cylinders of the engine.

A turbo-supercharger 16 is conventional for production EMD engines, and has a compressor 16a and turbine 16b. A gear train and over-running clutch assembly 16c drives the compressor 16a during idle and at low engine loads, when exhaust gas temperature (and thus heat energy) is insufficient to drive turbine 16b. At higher loads, increased exhaust gas temperature is sufficient to drive the turbine 16b, and the clutch disengages, such that turbocharger 16 operates like a true turbocharger.

A problem with turbo-supercharger 16 when used in transportation applications is a high AFR at idle and light loads. Turbo-supercharger 16 is designed to provide sufficient air at rated (high load) power conditions. However, at other operating conditions, especially at idle and light loads, it provides excess air. For example, an EMD engine will typically have an idle AFR greater than 300:1. In a locomotive application, at Notch 2, which is a light load, the engine will have an AFR of approximately 80:1. These high AFR's at idle and light loads result in relatively low exhaust temperatures, as well as relatively high fuel consumption due to the high parasitic losses of pumping excess air.

Figure 2:
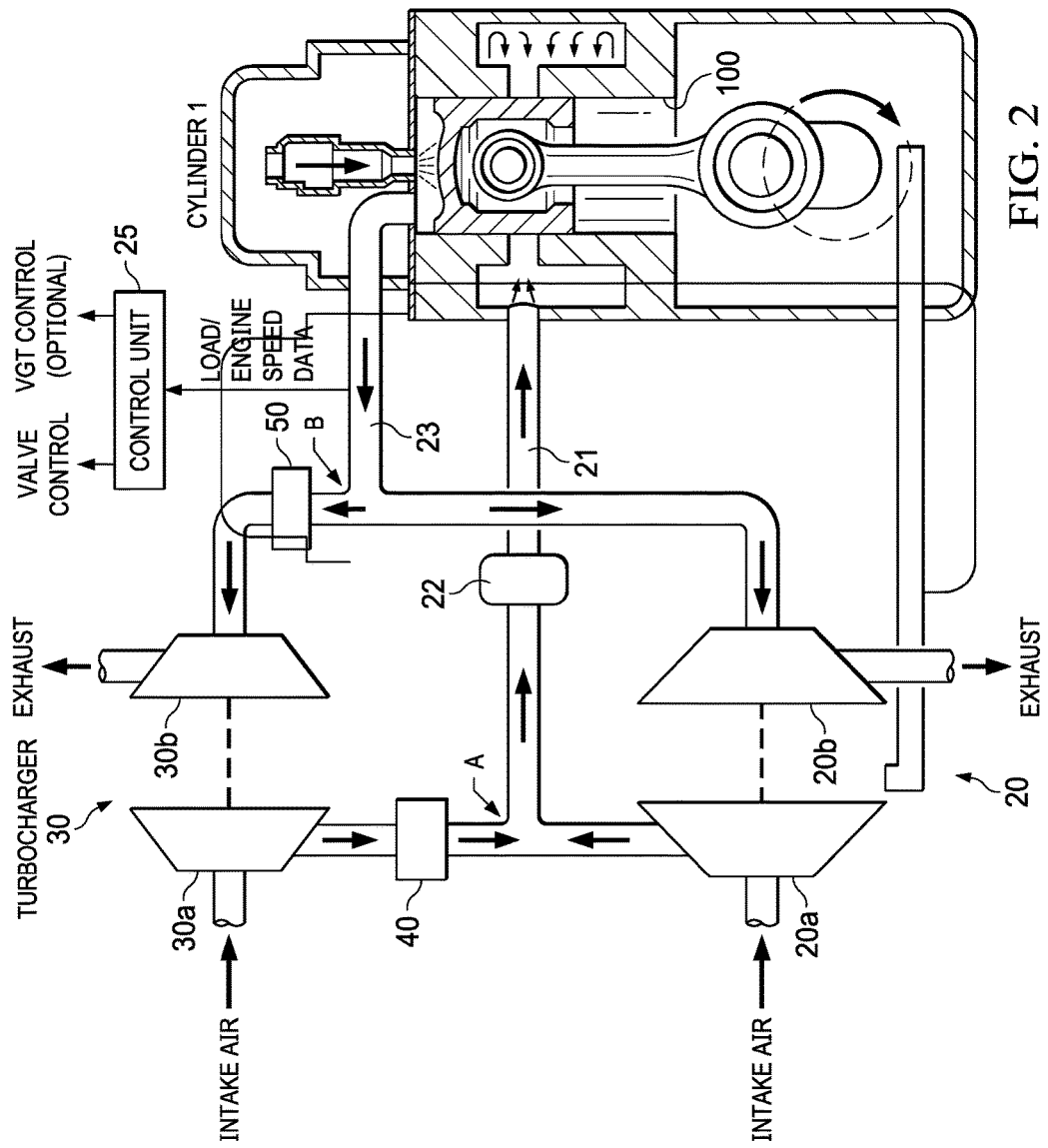
FIG. 2 is a representative drawing of a conventional EMD engine with an air boost system in accordance with one embodiment of the invention.
Figure 2A:
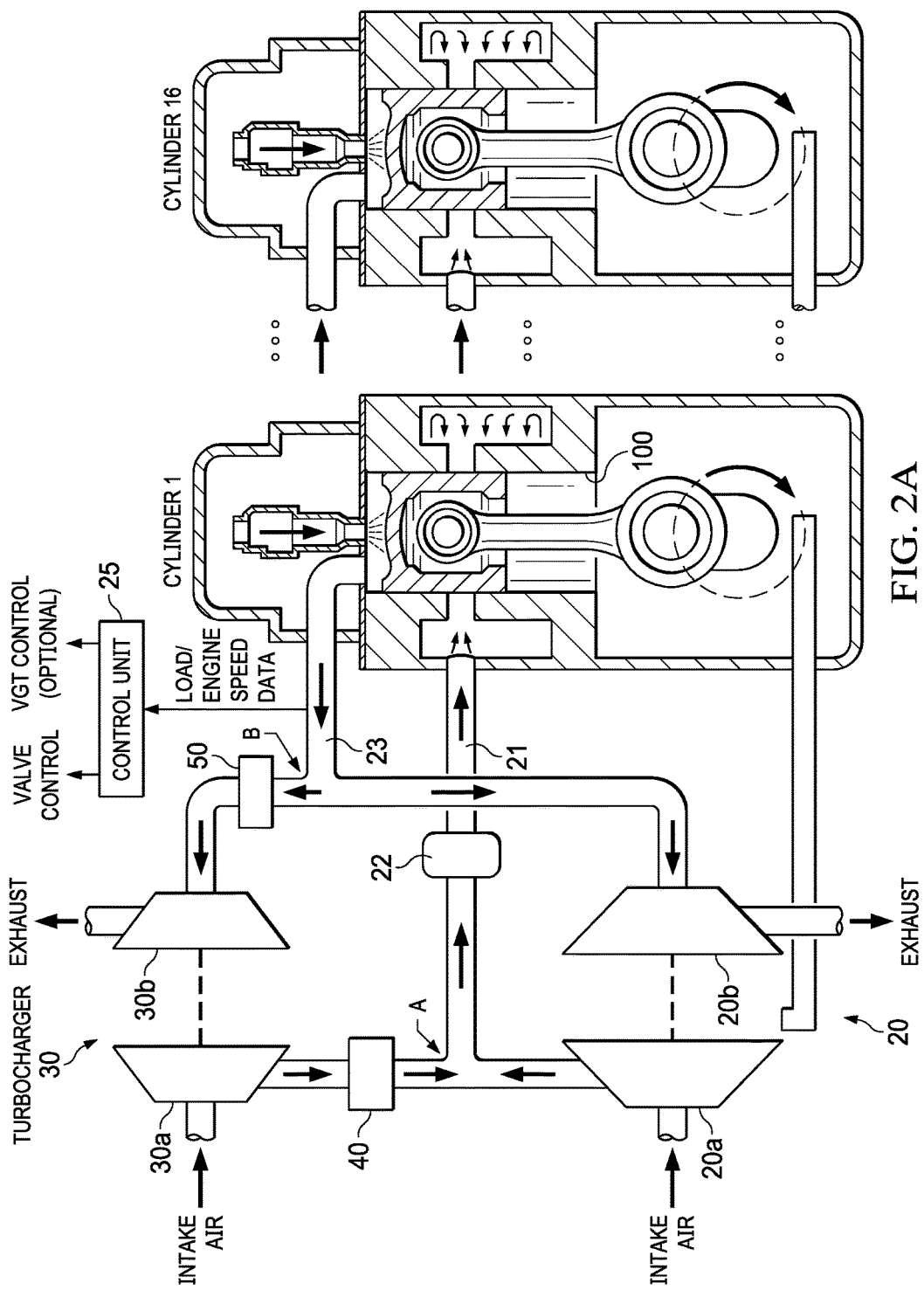
FIGS. 2A, 2B, and 2C illustrate the engine of FIG. 2, but with the number of cylinders explicitly shown as 16 cylinders, 20 cylinders, and 12 cylinders, respectively.
Figure 2B:
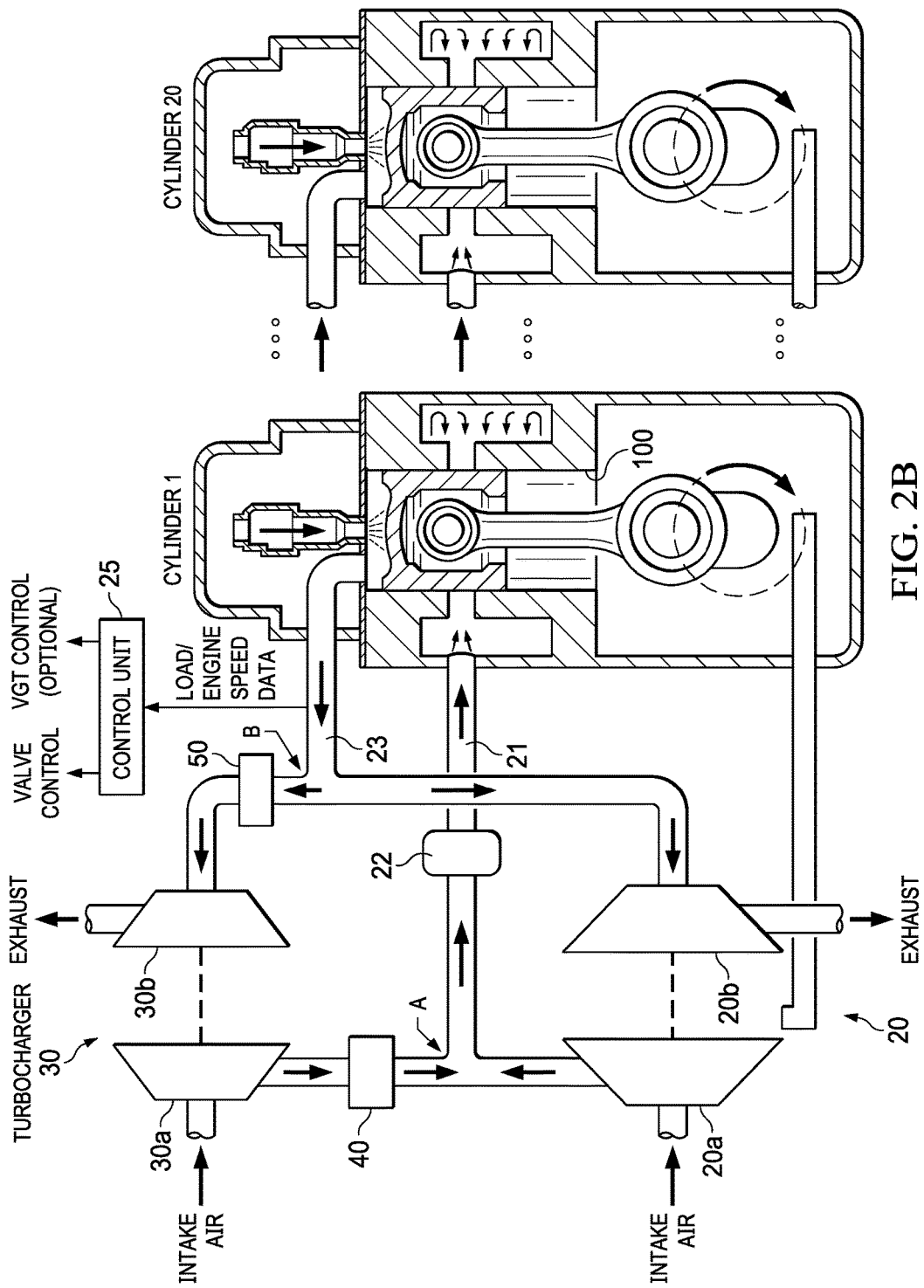
Figure 2C:
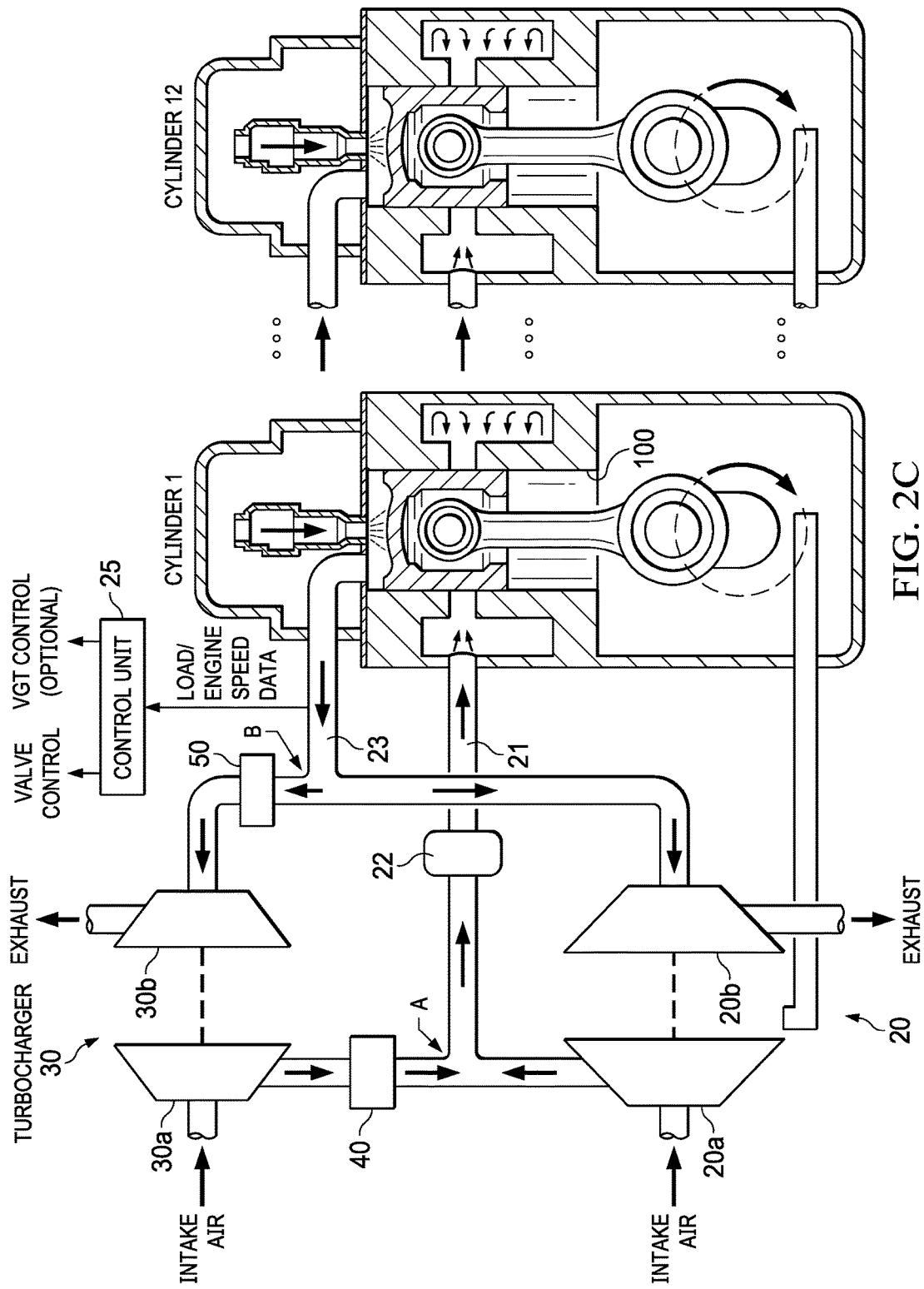

FIG. 2 illustrates an EMD engine, like the engine of FIG. 1, but having an air boost system in accordance with one embodiment of the invention. As explained below, the air boost system has an undersized turbo-supercharger 20 and a turbocharger 30, configured in parallel. The engine is assumed to be a 16 cylinder engine. FIGS. 2A, 2B, and 2C illustrate the engine of FIG. 2, but with the number of cylinders explicitly shown as 16 cylinders, 20 cylinders, and 12 cylinders, respectively.

Turbo-supercharger 20 is structured and operates like the above-described turbo-supercharger 16, having a compressor 20a and turbine 20b. However, turbo-supercharger 20 is "undersized", that is, it is one that would be conventionally installed in a smaller EMD engine. In other words, a production EMD engine of a particular size has an associated production size for its turbo-supercharger. Turbo-supercharger 20 has a production size that is conventionally associated with an EMD engine having fewer cylinders.

For purposes of example herein, turbo-supercharger 20 is one designed to be used on a 12 cylinder EMD engine. Turbo-supercharger 20 is referred to herein as a "12 cylinder" turbo-supercharger, and is commercially available. Because the engine of FIG. 2 is a 16 cylinder engine, turbo-supercharger 20 is "undersized" in relation to the size of the turbo-supercharger that would conventionally be used with the 16 cylinder engine.

Turbo-supercharger 20 is sized to provide the air needed at low and light loads. It is sufficiently large to provide air boost when the exhaust energy is not high enough to drive turbocharger 30, but need not be the size needed for air boost at higher loads. As explained below, the size of turbo-supercharger 20 will determine when turbocharger 30 will become active. Use of a smaller turbo-supercharger, such as one sized for an 8 cylinder EMD engine, is possible, and would require the turbocharger 30 to become active at lower loads as compared to a 12 cylinder turbo-supercharger.

Turbocharger 30 is sized to provide additional air boost at higher load conditions. A method of determining at what load to activate turbocharger 30 is described below. Turbocharger 30 has a compressor 30a and turbine 30b.

An example of a suitable turbocharger 30 is a variable geometry turbocharger (VGT). As explained below, this allows the AFR to be controlled at higher loads, when turbo-supercharger 20 cannot provide sufficient air at the higher loads.

Turbo-supercharger 20 and turbocharger 30 are configured in parallel. In the example of FIG. 2, compressors 20a and 30a each have their own fresh air intake, and their outputs join at an intake junction A to contribute to the intake manifold 21 upstream of the aftercooler 22. Turbines 20b and 30b each have their own input downstream of an exhaust junction B from the exhaust manifold 23, and each has a separate exhaust output to whatever exhaust aftertreatment system (not shown) is installed for the engine.

An intake valve 40 is downstream of the output of compressor 30a and upstream the intake junction at A. Valve 40 can be opened or closed to allow or not allow output from compressor 30a to enter the air intake flow into the intake manifold.

Valve 40 may be a simple reed valve that requires no active control. Once the pressure from turbocharger 30 exceeds the outlet pressure from turbo-supercharger 20, then the reeds open and flow is permitted from turbocharger 30. In other embodiments, valve 40 may be actively controlled.

An exhaust valve 50 downstream of the exhaust junction at B and upstream the input to turbine 30b. Valve 50 can be opened or closed to allow or not allow exhaust to enter turbine 30b. Valve 50 may be any one of various types of fast-actuating valves and may be an open/close type valve.

Valve 50 can be controlled to prevent exhaust from "leaking" through turbine 30b until the exhaust energy is sufficient to drive it and/or until the speed of turbine 20b is approaching a maximum. Also, valve 50 can be controlled to pass some exhaust through valve 50 and turbine 30b, thereby managing the speed of turbine 20b.

Other configurations may be possible for the flow lines into or from turbo-supercharger 20 and turbocharger 30. However, the configuration must allow turbo-supercharger 20 to independently operate at idle and light loads, and turbocharger 30 to add its output to that of turbo-supercharger 20 at higher loads.

Control unit 25, in different embodiments of the air boost system, provides varying levels of active control of the air boost system. This control level may be based, for example, on the application of engine 100 or on an emissions level to be targeted. In all cases, control unit 25 receives data representing the current engine load or engine speed, which as explained below, it uses to determine the operation of turbocharger 30. At a minimum control level, valve 40 is a reed valve and control unit 25 controls valve 50. At a medium control level, both valves 40 and 50 are actively controlled by control unit 25. At a higher level of control, turbocharger 30 is a VGT and is also actively controlled as well as valves 40 and 50.

Figure 3:
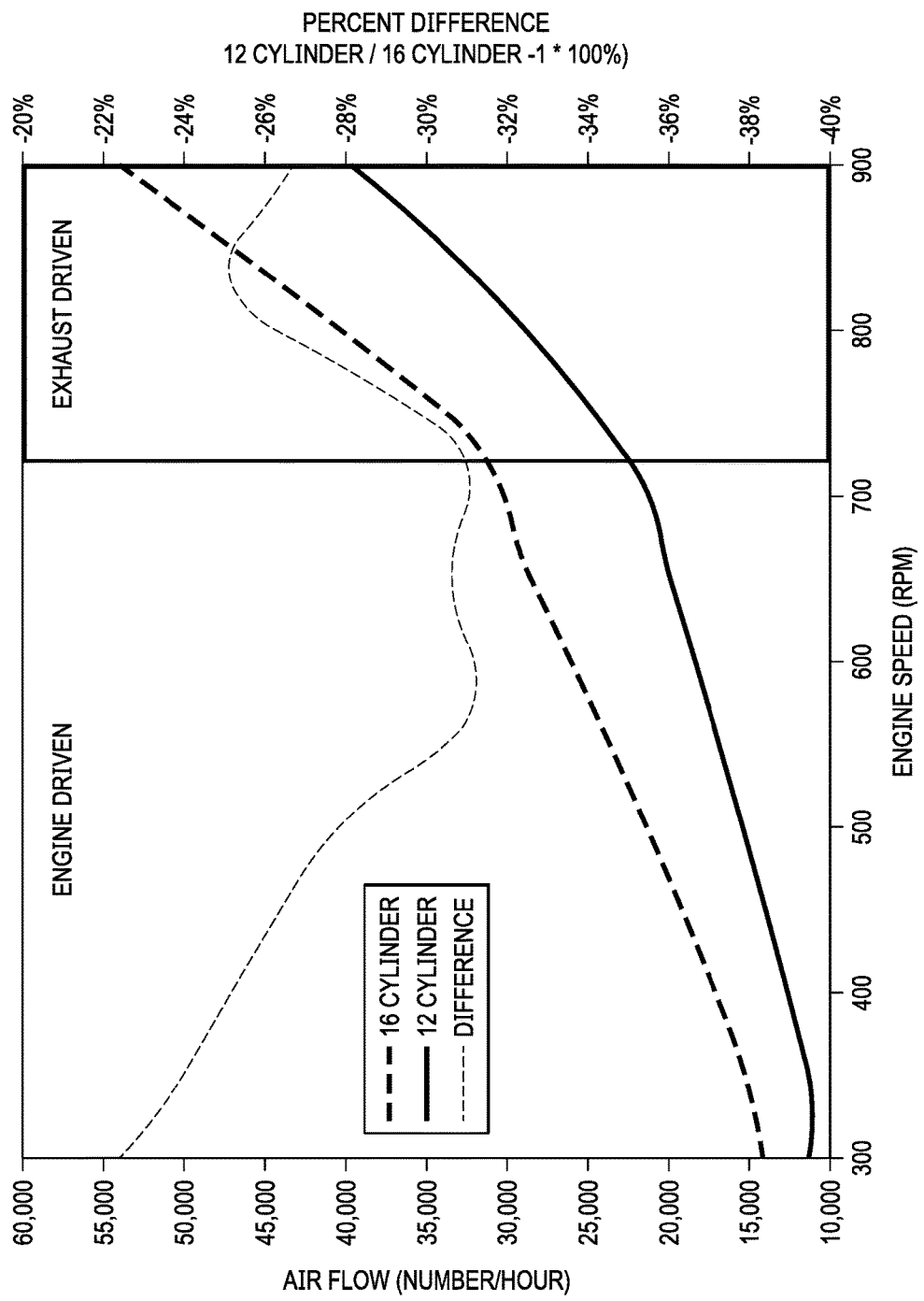
FIG. 3 illustrates the difference in airflow between a conventional 16 cylinder EMD engine and a conventional 12 cylinder EMD engine at varying load conditions.

FIG. 3 illustrates the difference in airflow between a conventional 16 cylinder EMD engine and a conventional 12 cylinder EMD engine at varying engine speeds (rpm) at locomotive load conditions. The 16 cylinder engine is assumed to have a conventionally sized turbo-supercharger, as is the 12 cylinder engine. The turbo-superchargers of both engines become exhaust driven at approximately 700 rpm. At locomotive loads, for a conventional EMD engine, this is considered "mid-load" or about Notch 6.

Comparison of the air flow output of the two conventional EMD engines shows that the 12 cylinder turbo-supercharger 20 provides approximately 22 percent lower air flow at idle speeds. It provides approximately 31 percent lower air flow when it becomes exhaust-driven.

Figure 4:
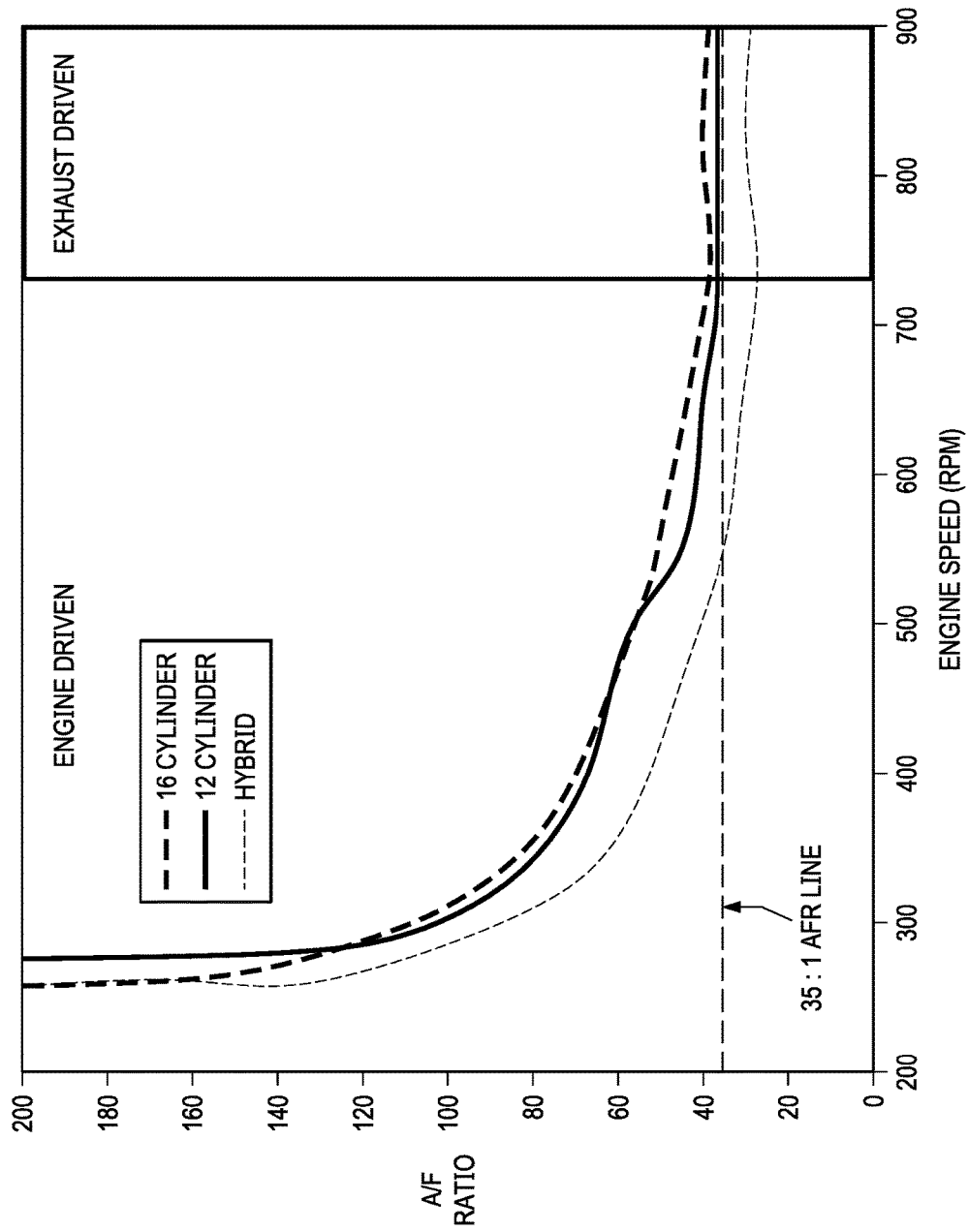
FIG. 4 illustrates the AFRs of a conventional 12 cylinder EMD engine, a conventional 16 cylinder EMD engine, and of a modeled "hybrid" EMD engine.

FIG. 4 illustrates the AFRs of a conventional 12 cylinder EMD engine, a conventional 16 cylinder EMD engine, and of a modeled "hybrid" EMD engine. The two conventional EMD engines are configured like the engine of FIG. 1, with their turbo-superchargers 16 conventionally sized for the size of the engine. The "hybrid" EMD engine is represented by calculated air flow produced by a conventional 12 cylinder engine and calculated fuel flow from a conventional 16 cylinder engine.

At the point that the turbo-superchargers of the conventional 12 and 16 cylinder engines become exhaust driven, their AFR's are slightly leaner than a 35:1 AFR.

This 35:1 AFR for the two conventional engines can be used to project the calculated AFR curve of the hybrid engine, as shown by the dotted line. The dotted line indicates the point on the hybrid engine's AFR curve at which its AFR is the same as the AFRs of the two conventional engines when they become exhaust-driven. As shown, for the hybrid engine, a 12 cylinder turbo-supercharger should provide an adequate air flow up to approximately 550 rpm at locomotive loads.

Figure 5:
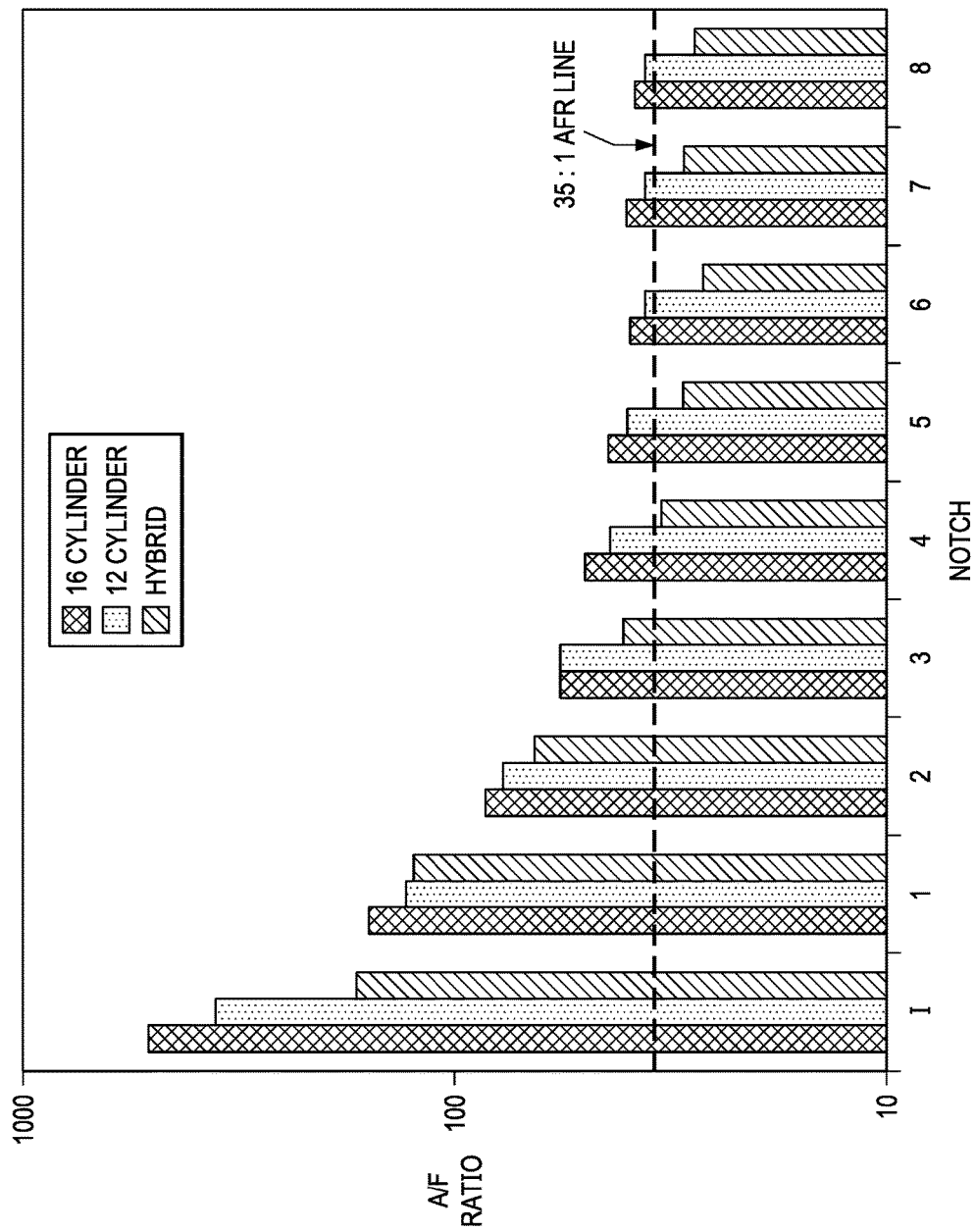
FIG. 5 illustrates the AFRs of the three engines of FIG. 4, but on a log scale vs. locomotive notch.

FIG. 5 illustrates the AFRs of the two engines and the calculated hybrid engine of FIG. 4, but on a log scale vs. locomotive notch. The 12 cylinder turbo-supercharger of the hybrid engine provides the desired AFR (35:1) on a 16 cylinder engine, up to Notch 4 (mid-load).

Referring again to FIG. 2, the engine represented therein is an embodiment of the "hybrid" engine of FIGS. 4 and 5, but its air boost system has an added turbocharger 30. As stated above, turbo-supercharger 20 is sized for a 12 cylinder engine. Turbocharger 30 is sized to provide sufficient additional air boost at higher loads.

Using the data of FIGS. 4 and 5, for the hybrid engine, below mid-load (Notch 4 or about 550 rpm at locomotive load conditions), turbo-supercharger 20 provides adequate air flow to provide the target minimum AFR (35:1). Above mid-load, turbo-supercharger 20 is insufficient to provide the target AFR.

Thus, at mid-load and above, turbocharger 30 is engaged to provide additional air flow to maintain the target AFR. Its output supplements the output of the turbo-supercharger 20, and the combined air flow, boosted by both air boost devices, enters the intake port of each cylinder 100.

Figure 6:
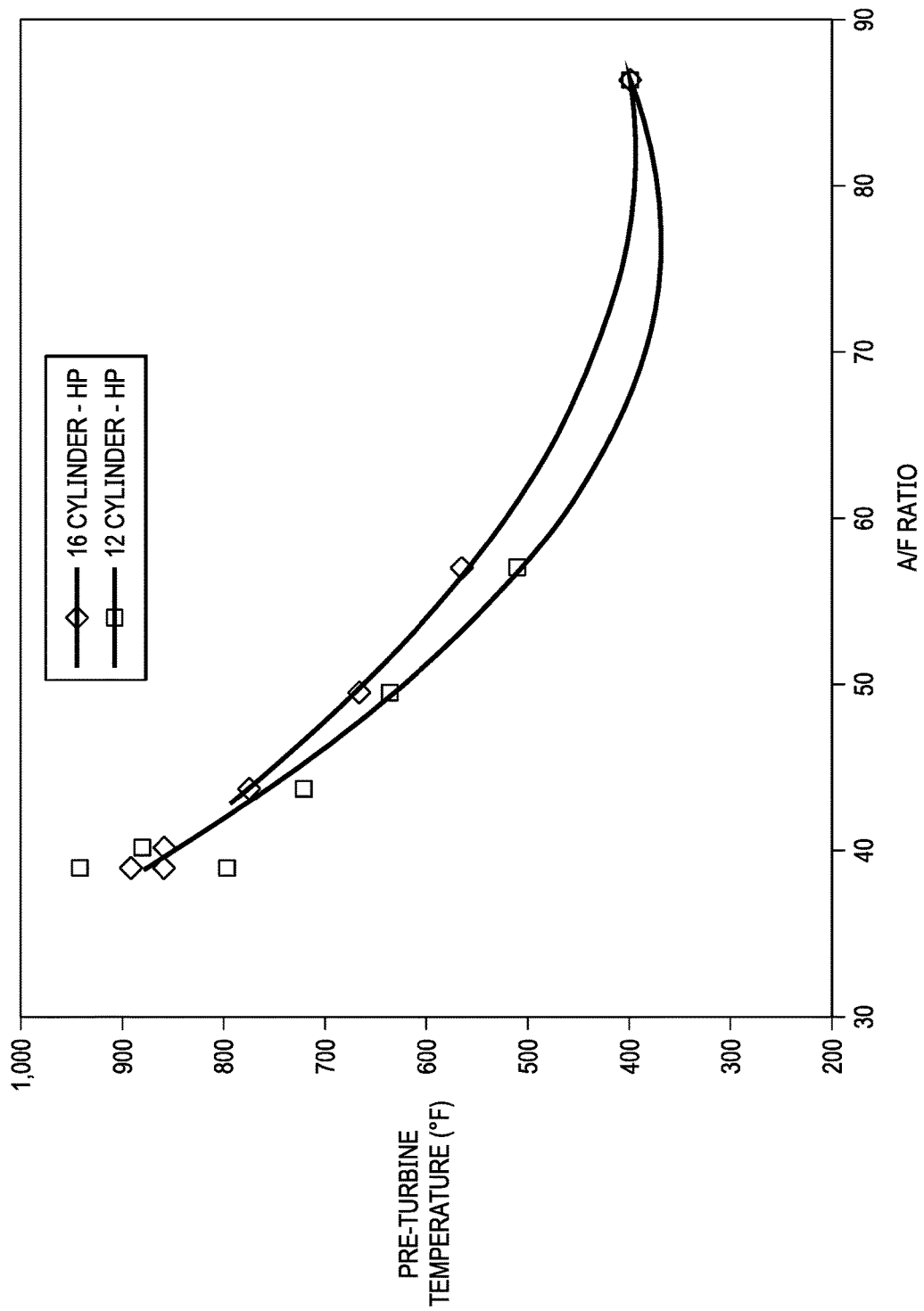
FIG. 6 illustrates how varying AFRs affects the pre-turbine temperature on conventional 12 cylinder and 16 cylinder EMD engines.

FIG. 6 illustrates how varying AFRs affects the pre-turbine temperature on conventional 12 cylinder and 16 cylinder EMD engines. This relationship determines the available energy in the exhaust to drive turbine 30b, and in turn, may be used to determine the appropriate size for turbocharger 30.

Additionally, there are a number of exhaust aftertreatment systems that require elevated temperatures to become active. Such aftertreatment systems include those using selective catalytic reduction (SCR) devices, diesel oxidation catalysts (DOCs), and diesel particulate filters (DPFs).

Reaching lower AFR's and higher exhaust temperatures at light loads increases the opportunity to activate turbines 20b and 30b and aftertreatment devices at lower engine speeds and lighter engine loads.

Figure 7:
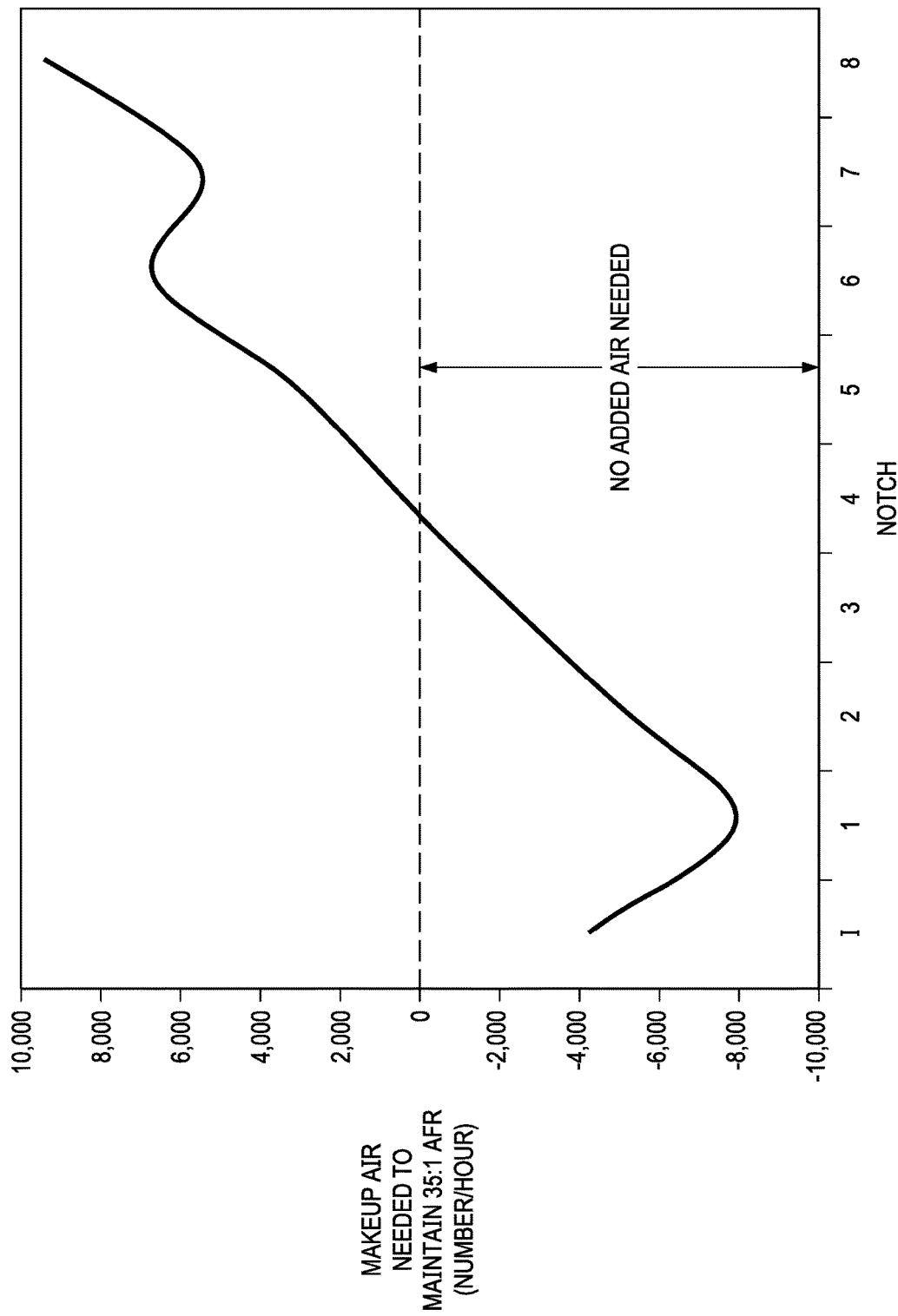
FIG. 7 illustrates the amount of additional intake air that would be provided by the turbocharger to maintain a target AFR (here 35:1) for the engine of FIG. 2.

FIG. 7 illustrates the amount of "makeup" intake air that would be provided by turbocharger 30 to maintain the target AFR (here 35:1) for the engine of FIG. 2. For these calculations, it is assumed that the turbocharger 30 is sized for approximately a 1200 horsepower engine. Further assumptions for the calculations are that the turbocharger is sized for a high-speed 4 stroke diesel engine, with an AFR of 25:1, and BSFC of 0.35#/hp-hr. For this turbocharger, an output of 10,000 pounds per hour is assumed.

Thus, for the engine of FIG. 2, assuming an output of approximately 10,000 pounds per hour, a turbocharger 30, sized for roughly 1,200 HP would be engaged above Notch 4 (mid-load) conditions. At idle and at loads less than mid-load, turbocharger 30 is not used. Above Notch 4 (mid-load), the turbocharger output can be controlled to maintain the target AFR.

An advantage of the air boost system described herein is a reduction of air being pumped by the engine at low and light loads, due to the undersizing of turbo-supercharger 20. At higher loads, with the addition of the boost provided by turbocharger 30, the appropriate amount of combustion air is provided. The result is lower parasitic pumping losses, and less fuel consumption, at idle and at loads below Notch 4. In addition, higher exhaust temperatures at these same conditions are conducive to improved aftertreatment performance. The increase in exhaust temperature allows the use of exhaust aftertreatment systems that rely on higher exhaust temperature to become active, such as SCR devices, DOCs, and DPFs. Demands on the amount of exhaust gas recirculation (EGR) may also decrease.

Although the above-described concepts are in terms of using an undersized (12 cylinder) turbo-supercharger with a 16 cylinder engine, the same concepts could be applied to engines having a different number of cylinders. The turbo-supercharger would be undersized for that engine, with an additional turbocharger configured in parallel. The engine load at which the turbocharger would become operable, as well as its output at varying loads, would be determined as described above.

What is claimed is:

1. An air boost system for a two-cycle engine, the two-cycle engine having a number of cylinders, an intake manifold, an exhaust manifold, comprising:
   a turbo-supercharger having a turbo-supercharger compressor, a turbo-supercharger turbine, and a gear drive assembly;
      wherein the turbo-supercharger being undersized for the two-cycle engine, insufficiently provides air flow for a target air-fuel ratio above a pre-determined mid load threshold;
   a turbocharger having a turbocharger compressor and a turbocharger turbine;
      wherein the turbocharger is installed in parallel with the turbo-supercharger; and
      wherein the turbocharger has a separate path to the turbo-supercharger turbine and the turbocharger turbine; and
   a first valve positioned between the output of the turbocharger compressor and the air intake junction;
   a second valve positioned between the input of the turbocharger turbine and the exhaust junction; and
   a control unit in response to at least one of engine speed and engine load to provide boosted intake air at loads above the pre-determined mid load threshold with air output of the compressors, which combines upstream the intake manifold at an air intake junction, and exhaust gas from each cylinder splits at an exhaust junction downstream the exhaust manifold.

2. The system of claim 1, wherein the turbo-supercharger is undersized such that it provides 22 percent or less air flow at engine speeds below the engine speed at which the turbo-supercharger becomes exhaust-gas driven, than an EMD (Electro-Motive Diesel) production sized turbo-supercharger.

3. The system of claim 1, wherein the two-cycle engine is a 16 cylinder engine and the turbo-supercharger is the production size for an EMD (Electro-Motive Diesel) 12 or 8 cylinder engine.

4. The system of claim 1, wherein the two-cycle engine is a 20 cylinder engine and the turbo-supercharger is the production size for an EMD (Electro-Motive Diesel) 8, 12 or 16 cylinder engine.

5. The system of claim 1, wherein the two-cycle engine is a 12 cylinder engine and the turbo-supercharger is the production size for an EMD (Electro-Motive Diesel) 8 cylinder engine.

6. A method of providing intake air to a two-cycle engine, the two-cycle engine having a number of cylinders, an intake manifold, an exhaust manifold, comprising:
   installing a turbo-supercharger having a turbo-supercharger compressor, a turbo-supercharger turbine, and a gear drive assembly;
   via a control unit
      determining a target air-fuel ratio for the two-cycle engine; and
      determining a mid load threshold representing an engine load above which the turbo super-charger is insufficient to provide air flow for the engine at the target air-fuel ratio;
         wherein the turbo-supercharger being undersized for the two-cycle engine insufficiently provides air flow for the target air-fuel ratio above the mid load threshold;
   installing a turbocharger having a turbocharger compressor and a turbocharger turbine;

wherein the turbocharger is installed in parallel with the turbo-supercharger; and wherein the turbocharger has a separate path to the turbo-supercharger turbine and the turbocharger turbine;

installing a first valve between the output of the turbocharger compressor and the air intake junction;

installing a second valve between the input of the turbocharger turbine and the exhaust junction; and controlling the first valve and the second valve via the control unit, to activate the turbocharger to provide boosted intake air at loads above the mid load threshold with air output of the compressors, which combines upstream the intake manifold at an air intake junction, and exhaust gas from each cylinder splits at an exhaust junction downstream the exhaust manifold.

7. The method of claim 6, wherein installing the turbo-supercharger is performed by undersizing the turbo-charger such that it provides 22 percent or less air flow at engine speeds below the engine speed at which the turbo-supercharger becomes exhaust-gas driven, than an EMD (Electro-Motive Diesel) production sized turbo-supercharger.

8. The method of claim 6, wherein the two-cycle engine is a 16 cylinder engine, and installing the turbo-supercharger is performed by installing the turbo-supercharger with an EMD (Electro-Motive Diesel) production size for a 12 or 8 cylinder engine.

9. The method of claim 6, wherein the two-cycle engine is a 20 cylinder engine, and installing the turbo-supercharger is performed by installing the turbo-supercharger with an EMD (Electro-Motive Diesel) production size for an 8, 12 or 16 cylinder engine.

10. The method of claim 6, wherein the two-cycle engine is a 12 cylinder engine, and installing the turbo-supercharger is performed by installing the turbo-supercharger with an EMD (Electro-Motive Diesel) production size for an 8 cylinder engine.

* * * * *